United States Patent [19]

Hatch

[11] Patent Number: 4,812,991
[45] Date of Patent: Mar. 14, 1989

[54] METHOD FOR PRECISION DYNAMIC DIFFERENTIAL POSITIONING

[75] Inventor: Ronald R. Hatch, Wilmington, Calif.

[73] Assignee: Magnavox Govt. and Industrial Electronics Company, Fort Wayne, Ind.

[21] Appl. No.: 858,206

[22] Filed: May 1, 1986

[51] Int. Cl.$^4$ .............................................. G01S 5/02
[52] U.S. Cl. .................................. 364/458; 364/449; 364/444; 342/356; 342/357
[58] Field of Search ............... 364/444, 449, 451, 452, 364/458, 460, 571; 342/394, 356, 357, 429, 442, 450, 451

[56] References Cited

U.S. PATENT DOCUMENTS

| | | | |
|---|---|---|---|
| 3,643,259 | 2/1972 | Entner | 364/449 |
| 4,054,880 | 10/1977 | Dalabakis et al. | 364/458 |
| 4,114,155 | 9/1978 | Raab | 342/394 |
| 4,359,733 | 11/1982 | O'Neill | 364/449 |
| 4,468,793 | 8/1984 | Johnson et al. | 342/357 |
| 4,532,637 | 7/1985 | Maine | 342/394 |
| 4,613,864 | 9/1986 | Hofgen | 342/357 |
| 4,652,884 | 3/1987 | Starker | 342/357 |
| 4,667,203 | 5/1987 | Counselman, III | 342/450 |
| 4,672,382 | 6/1987 | Fukuhara et al. | 342/357 |

FOREIGN PATENT DOCUMENTS 0186198  7/1986  European Pat. Off. ............ 342/357

OTHER PUBLICATIONS

"Receivers for the NAVSTAR global positioning system" by P.K. Blair et al., IEEE Proc., vol. 127, pt. F. No. 2, Apr. 1980, pp. 163–167.

"Guide to GPS Positioning" by Wells et al., Canadian GPS Associates, Apr. 1986, pp. 3–20.

Yakos et al., "Time Dissemination Using Navstar Global Positioning System (GPS) Phase IIB User Equipment", Proc. 35th Am. Freq. Control Symposium, USAERADCOM, Ft. Monmouth, N.J., May 1981, pp. 537–545.

Primary Examiner—Parshotam S. Lall
Assistant Examiner—V. N. Trans
Attorney, Agent, or Firm—Richard T. Seeger

[57] ABSTRACT

A method and apparatus for rapidly and accurately determining the position coordinates of a remote, movable receiver relative to a fixed reference receiver. The technique utilizes successive code measurements and carrier phase measurements of both the $L_1$ and $L_2$ carrier signals broadcast from four or more orbiting GPS satellites. Code measurements based on a weighted average of the individual $L_1$ and $L_2$ code measurements in each satellite/receiver link are adjusted in accordance with the corresponding carrier phase measurement for an $L_1-L_2$ carrier difference signal and are further smoothed over time. This yields a rapid determination of the remote receiver's position coordinates, with progressively increasing accuracy. After merely about two to three minutes of processing, a wide laning carrier phase procedure can be implemented to yield a position determination that is accurate to within about one centimeter.

10 Claims, 2 Drawing Sheets

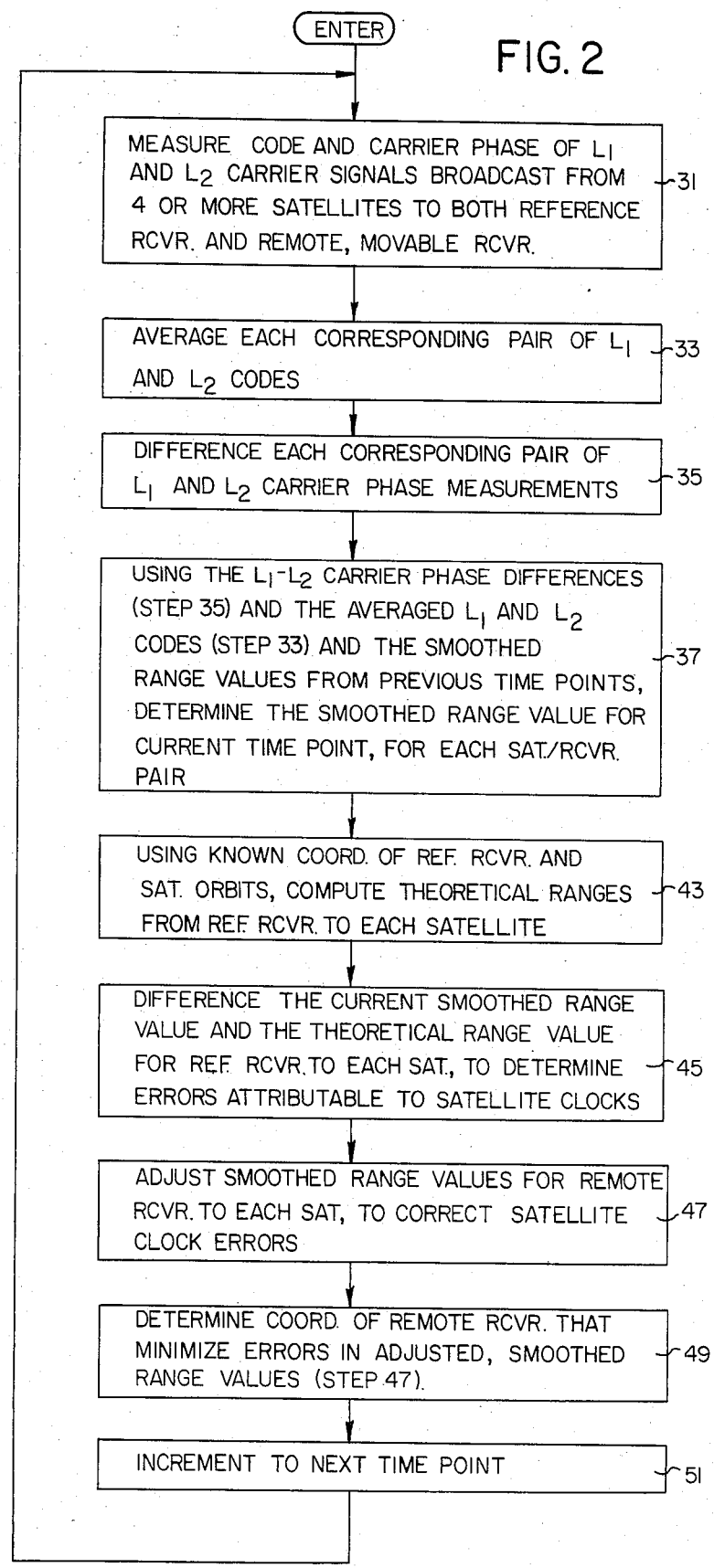

METHOD FOR PRECISION DYNAMIC DIFFERENTIAL POSITIONING

BACKGROUND OF THE INVENTION

This invention relates generally to positioning systems using signals broadcast from a plurality of orbiting satellites, and, more particularly, to satellite-based differential positioning systems that determine the position coordinates of a remote receiver relative to a reference receiver having known coordinates.

Satellite-based positioning systems such as the Global Positioning System (GPS) are now a highly popular means of accurately and precisely determining a receiver's coordinates. These systems have numerous practical applications and, depending on the time duration over which measurements are taken, they can determine a receiver's position to sub-centimeter accuracy.

In GPS, a number of satellites orbiting the earth in well-defined polar orbits continuously broadcast signals indicating their precise orbital positions. Each satellite broadcasts two modulated carrier signals, designated $L_1$ and $L_2$. The signals from the various satellites are all broadcast on the same two frequencies, but are each modulated by a unique, pseudorandom digital code. Each satellite signal is based on a precision internal clock. The receivers detect the superimposed modulated $L_1$ and $L_2$ carrier signals and measure either or both of the code and carrier phase of each detected signal, relative to their own internal clocks. The detected code and carrier phases can be used to determine the receiver's position coordinates.

In absolute positioning systems, i.e., systems that determine a receiver's position coordinates without reference to a nearby reference receiver, the position determination is subject to errors caused by the ionosphere. The ionosphere imposes a group delay on the modulated signals, delaying detection of the modulated code. This makes the broadcasting satellite appear to be further away that it is, in fact. This error can be as much as several hundred meters, although it is more typically on the order of ten meters.

By contrast, the same ionosphere causes a phase advance of the carrier signal, which is equal in magnitude to the delay in the detected code phase. The ionosphere-caused range measurement errors can be corrected by adjusting the $L_1$ and $L_2$ code measurements in accordance with a suitable combination of the $L_1$ and $L_2$ carrier phase measurements. Such a technique is described in a paper by Ronald R. Hatch, entitled "The Synergism of GPS Code and Carrier Measurements," Magnavox Technical Paper MX-TM-3353-82, Jan. 1982.

Although the ionospheric correction technique referred to above is generally satisfactory in eliminating the ranging errors caused by the ionosphere in a absolute positioning system, it has not proven to be entirely satisfactory. This is because the noise level is increased substantially by the correction procedure and because the procedure generally requires a substantial number of independent measurements to be processed before a sufficiently accurate measurement can be obtained.

Frequently, a reference receiver located at a reference site having known coordinates is available for receiving the satellite signals simultaneously with the receipt of signals by the remote receiver. If the reference and remote receivers are sufficiently close to each other, e.g., within about 50 to 100 kilometers, it can be assumed that the ionosphere affects the various satellite signals they receive substantially equally. In this circumstance, the signals received simultaneously by the two receivers can be suitably combined to substantially eliminate the error-producing effects of the ionosphere and thus provide an accurate determination of the remote receiver's coordinates relative to the reference receiver's coordinates.

To properly combine the signals received simultaneously by the reference receiver and the remote receiver, and thereby eliminate the error-producing effects of the ionosphere, it is necessary to provide an initial estimate of the remote receiver's coordinates. By far the easiest way to obtain the initial relative position of the remote receiver is to locate it at a pre-surveyed marker. Unfortunately, such markers are not always available. An alternative procedure for determining the initial coordinates of the remote receiver relative to those of the reference receiver is to exchange the antennas for the two receivers while both continue to detect the $L_1$ carrier signals. This results in an apparent movement between the two antenna of twice the vector distance between them. This apparent movement can be halved and used as the initial offset between the two receivers.

Both of the initial relative positioning techniques described above suffer the disadvantage of having to be repeated if the number of $L_1$ carrier signals being detected ever drops below four, whether due to loss of lock or due to signal path obstruction. This generally requires a substantial amount of time and is, therefore, not considered desirable.

Another approach proposed in the past for determining the initial relative positions of a remote receiver and a reference receiver in a differential positioning system is to constrain the remote receiver to a fixed position until its coordinates can be reestablished to within about ten centimeters of accuracy. This allows the use of routine fixed site positioning techniques that process the $L_1$ carrier phase and code measurements. Unfortunately, these techniques generally require at least ten minutes to yield the required accuracy.

It should, therefore, be appreciated that there is a need for an apparatus and technique for determining the initial coordinates of a remote receiver relative to a fixed reference receiver, without imposing any requirements on specific movement of the remote receiver and without requiring an undue amount of time. The present fulfills this need.

SUMMARY OF THE INVENTION

The present invention resides in an apparatus and related method for determining the coordinates of a remote receiver relative to a reference receiver having known coordinates, without imposing any requirements on initial movement of the remote receiver and without requiring undue time to provide an initial position determination. The method uses both of the modulated $L_1$ and $L_2$ carrier signals broadcast from a number of GPS satellites. If the number of detected carrier signals ever drops momentarily below a required number, the method can accurately redetermine the remote receiver's coordinates without imposing any special requirements on the remote receiver's movement and without necessitating undue time delay.

In the method of the invention, an initial step measures the range to each of four or more GPS satellites from both the reference receiver and the remote receiver, at each of a succession of time points. This initial step of measuring includes steps of detecting both the $L_1$ and $L_2$ codes and the $L_1$ and $L_2$ carrier phases, for each satellite/receiver pair, at each time point. A predetermined linear combination of the detected $L_1$ and $L_2$ codes is computed, to produce a single code measurement for each satellite/receiver pair, at each time point. Similarly, a predetermined linear combination of the detected $L_1$ and $L_2$ phases is computed, to produce a single carrier phase measurement for each satellite/receiver pair, at each time point. The linear combinations are selected such that the ionosphere affects the resulting code and carrier phase measurements substantially equally.

The successive code measurements are then smoothed in accordance with the corresponding carrier phase measurements at the same time point and in accordance with the code and carrier phase measurements for all previous time points. This produces a carrier adjusted code measurement for each satellite/receiver pair, at each time point. The smoothed, carrier-adjusted code measurements for the reference receiver are then compared with theoretical range values based on the known coordinates of the reference receiver and the known orbits of the four or more satellites, to produce an error value for each smoothed code measurement. Satellite clock errors are then determined based on these error values. The successive smoothed code measurements for the remote receiver are then adjusted to eliminate the effects of the satellite clock errors, to produce a succession of corrected range measurements for each satellite. Finally, estimated coordinates of the remote site are determined to be the particular coordinates that minimize errors in the corrected range measurements.

In other aspects of the invention, the code measurements produced in the initial step of measuring is produced by computing a weighted average of the individually detected $L_1$ and $L_2$ codes. This reduces the noise level from that of the individual $L_1$ and $L_2$ code measurements. In addition, these code range measurements can be adjusted in accordance with the phase difference of the $L_1$ and $L_2$ carrier phase measurements. This phase difference reflects a wavelength that is much longer than that of either of the $L_1$ or $L_2$ carrier signals, which facilitates a more rapid determination of the number of whole cycles in each link and thus leads to a faster and more accurate determination of the remote receiver's coordinates.

In another aspect of the invention, the step of smoothing can include an initial step of computing an expected value for each code measurement, based on the corresponding smoothed code measurement for the previous time point and on the difference between the corresponding carrier phase measurements for the same time point and the previous time point. The smoothed code measurements for the current time point are then produced by computing a weighted average of the current code measurements and their corresponding expected code measurements.

The final step of determining coordinates can include an initial step of differencing the corrected range measurements, produced in the step of adjusting, and theoretical range values, based on an estimate of the remote receiver's coordinates and the known satellite orbits. This produces a set of error values for each time point. The estimate of the remote receiver's coordinates are then adjusted, to minimize the set of error values for each time point. The method can be performed recursively, in real time, with each estimate of coordinates being based on the adjusted estimate for the previous time point.

In yet another aspect of the invention, the estimate of the remote receiver's coordinates can be made even more accurate by differencing the $L_1-L_2$ carrier phase measurements for the remote receiver and the corresponding corrected range measurements, produced in the step of adjusting. This produces a set of error values for each time point. The particular position coordinates that minimize this set of error values can then be determined for each time point. This same procedure can then be performed using first the individual $L_1$ or $L_2$ carrier phase measurements and then a weighted average of the individual $L_1$ and $L_2$ carrier phase measurements, to enhance the position determination still further Other aspects and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

FIG. 2 is a simplified flowchart showing the operational steps performed by the apparatus of the invention in accurately determining, in real time, the position coordinates of the movable, remote receiver of FIG. 1.

DESCRIPTION OF THE PREFERRED EMBODIMENT

Figure 1:
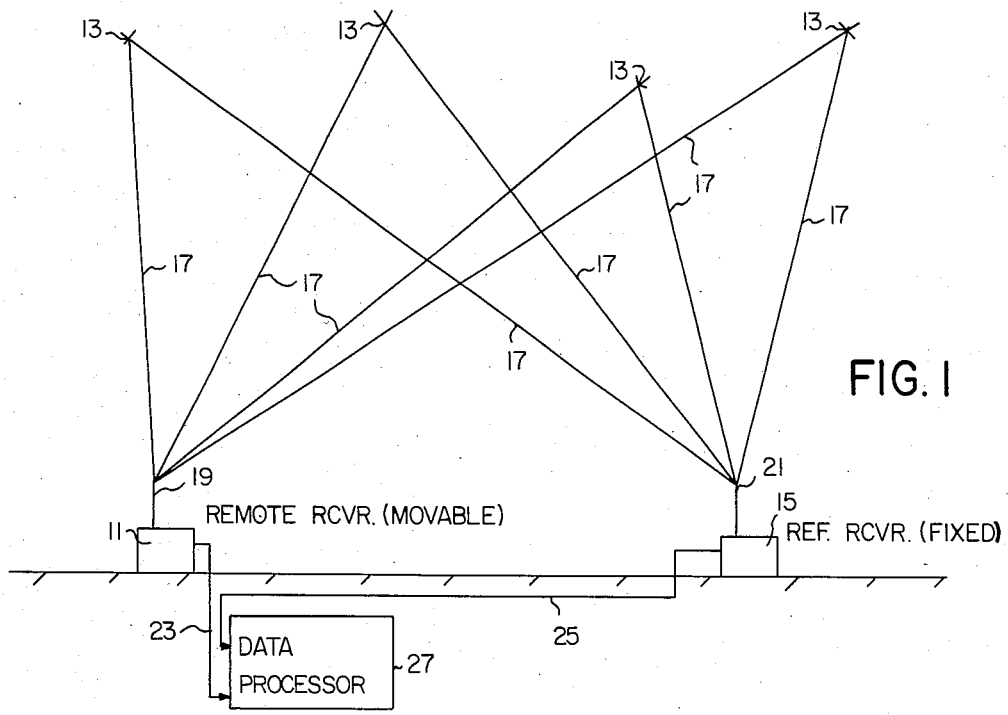
FIG. 1 is a schematic diagram (not to scale) of a dynamic differential positioning system having two receivers, one located at a reference site having known coordinates and the other located at a remote, movable site having unknown coordinates, the two receivers detecting signals broadcast from four or more orbiting satellites, to determine the coordinates of the remote site.

As shown in the accompanying drawings, this invention is embodied in an apparatus for accurately determining the position coordinates of a movable, remote receiver 11 using signals broadcast from a plurality of orbiting satellites 13. The apparatus is particularly useful as part of the Global Positioning System (GPS), in which each satellite broadcasts two separate carrier signals, denoted $L_1$ and $L_2$, each modulated by a separate pseudorandom digital code. A reference receiver 15 is located at a reference site having known coordinates, which can be spaced as much as 50-100 kilometers from the movable remote receiver 11. For the four depicted satellites, there are, therefore, eight separate links 17 formed between the satellites and the two receivers.

The $L_1$ and $L_2$ carrier signals broadcast by the four satellites 13 are on the same two frequencies, but each such carrier signal is modulated by a unique pseudorandom digital code. The respective remote receiver 11 and reference receiver 15 include antennas 19 and 21 for receiving the superimposed, incoming modulated carrier signals, and the receivers separate the received signals from each other and measure the code and carrier phase of each incoming signal. These code and carrier phase measurements are transmitted on lines 23 and 25 from the respective receivers 11 and 15 to a data processor 27, for position determination.

The remote receiver 11 and reference receiver 15 make their code and carrier phase measurements on a continuous basis. For example, each new set of measurements can be transmitted on lines 23 and 25 to the data processor 27 every three seconds.

The data processor 27 processes the successive code and carrier phase measurements it receives on lines 23 and 25 in real time, producing successively more accurate position determinations. Significantly, the algorithm implemented by the data processor imposes no constraints on movement of the remote receiver 11. The receiver can be moved in any fashion while the successive measurements are being made, yet the data processor still provides successively more accurate position determinations. Accuracy to within about one centimeter can be achieved after processing the data for as little as two to three minutes.

The rapid determination of the remote receiver's position coordinates and the elimination of any need for initial constraints on the remote receiver's position result from combining the successive code and carrier phase measurements in a special algorithm. In particular, two special steps are taken to improve the accuracy and speed. First, the $L_1$ and $L_2$ code measurements for each satellite/receiver link 17 are averaged, to provide a reduction in noise. Second, the $L_1$ and $L_2$ carrier phase measurements for each satellite/receiver link are differenced to provide an effective wavelength that is substantially longer than that of the individual $L_1$ or $L_2$ carriers. This reduces the time required to ascertain the number of whole carrier cycles in each link, and thus permits an earlier use of standard $L_1$ carrier phase techniques.

The preferred method of the invention will be better understood with reference to FIG. 2, which depicts, in simplified form, the successive steps required to accurately determine the remote receiver's position coordinates.

In an initial step 31, the reference receiver 15 and the remote, removable receiver 11 measure the current codes and carrier phases of both the $L_1$ and $L_2$ carrier signals broadcast from all of the four or more satellites 13. These measurements are performed on the signals currently being received and will be repeated subsequently when this step 31 is repeated. Each time, the carrier phase measurements can be compacted, in a conventional fashion, reduce the magnitude of any phase noise in the successive measurements. For example, the measurements can be made every 200 milliseconds and compacted into average values that are updated once every three seconds.

In a following step 33, the $L_1$ and $L_2$ code measurements for each satellite/receiver link 17 are averaged with each other, to produce a single code measurement for each link. This reduces the measurement's effective noise, and provides an effective gain of about 1.4. The $L_1$ and $L_2$ measurements are preferably combined to produce a frequency-weighted average, as follows:

$$P(n)=(L_1*P_1+L_2*P_2)/(L_1+L_2)$$

Where:

P(n)=Weighted average code measurement at $n^{th}$ time point
$L_1$=Frequency of $L_1$ carrier signal
$L_2$=Frequency of $L_2$ carrier signal
$P_1$=$L_1$ code measurement at $n^{th}$ time point
$P_2$=$L_2$ code measurement at $n^{th}$ time 0322 point.

In a following step 35, each corresponding pair of $L_1$ and $L_2$ carrier phase measurements are differenced, to produce a phase measurement for a difference carrier having a substantially longer wavelength (i.e., 86 centimeters) than that of either the $L_1$ carrier (i.e., 19 centimeters) or the $L_2$ carrier (i.e., 24 centimeters). This can be expressed, in equation form, as follows:

$$C(n)=C_1-C_2$$

Where:

C(n)=($L_1$−$L_2$) Carrier phase measurement at $n^{th}$ time point
$C_1$=$L_1$ carrier phase measurement at $n^{th}$ time point
$C_2$=$L_2$ carrier phase measurement at $n^{th}$ time point.

The phase measurement of the difference carrier is thus much coarser, facilitating a significantly more rapid determination of the number of whole carrier difference cycles present in each link. This determination ultimately leads to a rapid determination of the remote receiver's coordinates with maximum accuracy.

A following step 37 of the method produces a so-called smoothed range value for the current time point, for each satellite/receiver link 17. This smoothed range value is produced by computing a weighted average of the current code measurement (produced in step 33) and an expected code measurement, which is based on the smoothed range value for the previous time point (produced in this step 37), adjusted by the difference in carrier phase measurements (produced in step 35) for the current and previous time points. In the case of the first time point, in which case there is no previous time point, the smoothed range value can simply be made equal to the first code measurement. This step will be better understood with reference to FIG. 3.

Figure 3:
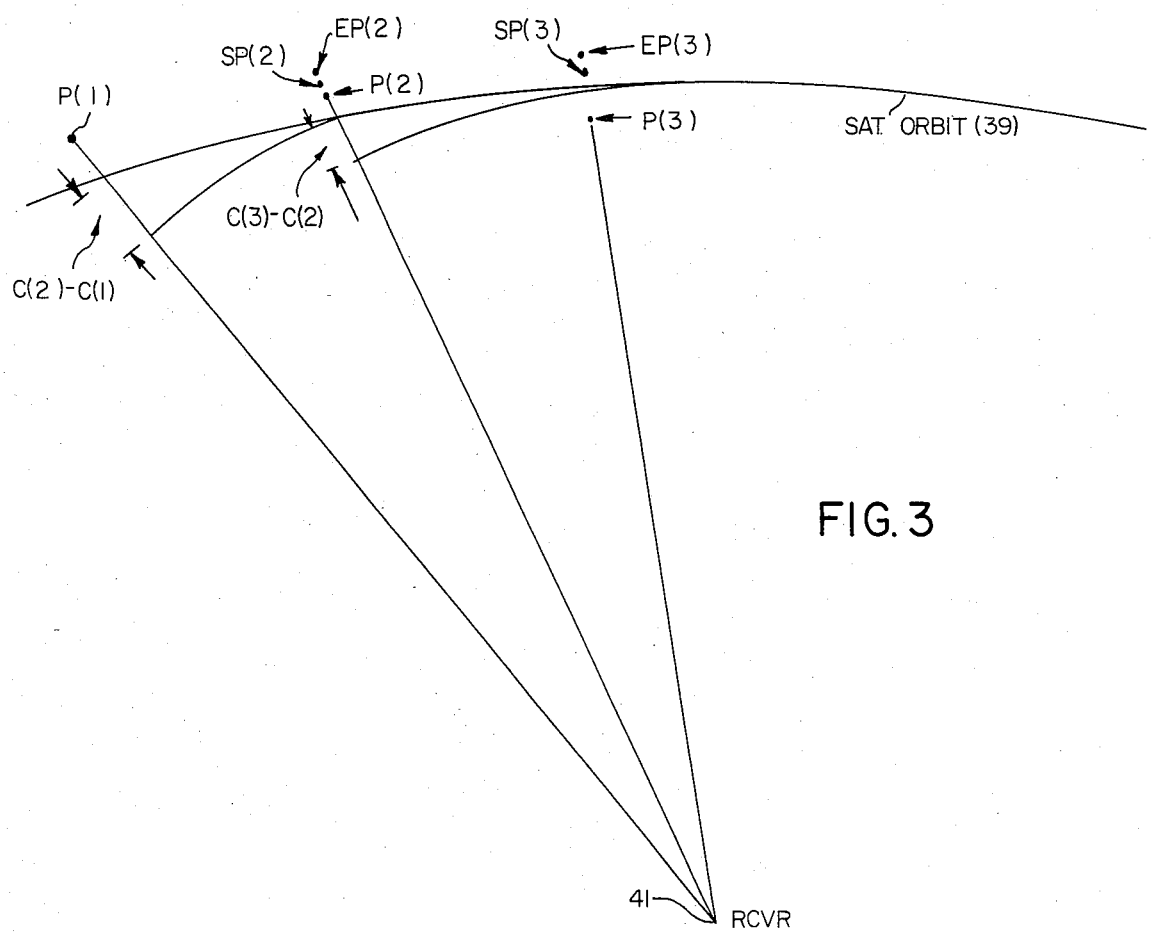
FIG. 3 is a schematic diagram showing how the successive code measurements are smoothed to improve their accuracy.

FIG. 3 is a schematic diagram showing the orbital path 39 of a single satellite in relation to a receiver located at a point indicated by the reference numeral 41. Code and carrier phase measurements are depicted as being made at three separate time points. At time point 1, the code measurement indicates that the satellite is located at a point P(1). This point differs from the satellite's actual position on the orbit line 39 because of noise in the $L_1$ and $L_2$ code measurements. At time 2 (e.g., three seconds later), the code measurements indicate that the satellite is then located at the position indicated by P(2). In addition, the change in the carrier phase measurement from the first time point to the second time point, i.e., C(2)−C(1), indicates the the satellite has moved closer to the receiver by the indicated amount.

In combining the various measurements in step 37 (FIG. 2), to produce the smoothed range value for the second time point, an expected value for the code, i.e., EP(2), is defined to be equal to the code actually measured at the first time point combined with the change in carrier phase measurements from the first time point to the second time point, i.e., C(2)−C(1). The smoothed code is then defined to be the arithmetic average of the second code measurement, i.e., P(2), and the expected value of the second code range measurement, i.e., EP(2). Thus, for the second time point, these equations are:

$$EP(2) = P(1) + (C(2) - C(1))$$

$$SP(2) = (P(2) + EP(2))/2.$$

Generalizing for the $n^{th}$ time point, these two equations become:

$$EP(n) = SP(n-1) + (C(n) - C(n-1))$$

$$SP(n) = EP(n) + (P(n) - EP(n))/n.$$

Thus, in FIG. 3, the smoothed code range at the second time point, i.e., SP(2), is located midway between the expected code, i.e., EP(2), and the actually measured code, i.e., P(2). Similarly, for the third time point, the smoothed code, i.e., SP(3), is located one-third of the way from the expected code, i.e., EP(3), to the actually measured code, i.e., P(3). At time n, each of the measured codes, i.e., $P(1) - P(n)$, has a $1/n^{th}$ contribution to the smoothed code range, i.e., SP(n). Actually, because all of the successive carrier phase measurements accurately reflect range changes since the first time point, the successive code measurements all function to improve the accuracy of the code measurement for the first time point. Each successive time point is thus expected to yield a slightly more accurate range determination. It will be appreciated that a Kalman filtering approach could alternatively be used to smooth the successive code values.

With reference again to FIG. 2, it will be appreciated that the step 37 produces the smoothed code values for the current time point, i.e., SP(n), for each satellite/receiver link 17. These represent the best estimate of the range from each receiver 11 or 15 to each satellite 13, based on the code and carrier phase measurements made for the current and all previous time points.

In a subsequent step 43, the theoretical ranges from the reference receiver 15 to each of the four or more satellites 13 are computed using the known coordinates of the reference receiver and the known orbits of the satellites. These known orbits can be derived from the detected $L_1$ and $L_2$ codes or from separate sources such as the National Geodetic Survey.

Next, in 45, the difference between the current smoothed range value and the theoretical range value, for each link 17 between the reference receiver 15 and the various satellites 13, is determined. The determined differences are defined to be attributable to errors in the internal clocks of the various satellites. In fact, these errors can also be attributed to ionospheric effects, which delay the modulated codes and advance the carrier phases, and satellite orbit errors. However, because these errors will likely affect the signals received by the two receivers 11 and 15 substantially equally, it makes no difference whether the errors are attributable to the ionosphere, orbit errors, or the satellite clocks.

The differences between the smoothed range values and the theoretical range values determined in step 45 can be expressed in terms of integer and fractional values of the $L_1 - L_2$ carrier difference measurement. Arbitrarily, but advantageously, the integer portion of the difference is determined to be a bias value and the fractional portion is determined to be the satellite clock error.

In a succeeding step 47, the smoothed range values for each link 17 between the satellites 13 and the remote receiver 11 are adjusted to correct for the satellite clock errors determined in step 45. The resulting adjusted, smoothed range values represent the best current estimate of the range from the remote receiver to each satellite, with satellite clock errors, orbit errors and ionospheric effects having been substantially canceled out, and with the benefit of all of the previous code and carrier phase measurements being factored in.

In a following step 49, the adjusted, smoothed range values for the links 17 between the remote receiver 11 and the four or more satellites 13 are processed to determine the particular X, Y and Z position coordinates for the receiver and the particular receiver clock error value that minimize errors in these range values. If the measurements from precisely four satellites are being processed, the three position coordinates and the receiver clock error can be solved for exactly, wit zero resulting error. If the measurements for five or more satellites are being processed, on the other hand, the equations can be solved in a least mean square error fashion.

More particularly, step 49 can include an initial step of differencing the adjusted, smoothed range values (from step 47) and theoretical range values, which are based on an estimate of the remote receiver's coordinates and the known satellite orbits. This produces a set of error values for each time point. The estimate of the remote receiver's coordinates are then adjusted, to minimize the set of error values for each time point. Because the method is performed recursively, each initial estimate of the coordinates can be based on the adjusted estimate for the previous time point.

In a final step 51, the program increments to the next time point and returns to the initial step 31 of measuring the codes and carrier phase of the various incoming carrier signals. The process described in detail above is repeated for as long as desired, each time yielding a successively more accurate position determination.

After processing the data for approximately two to three minutes, the position determination can be expected to be accurate to within one-half wavelength of the $L_1 - L_2$ carrier difference (i.e., about 43 centimeters). At that time, differences can be computed between the ranges from the best estimate of the remote receiver coordinates to each satellite 13 and the corresponding $L_1 - L_2$ carrier phase measurements. The fractional portions of the resulting differences form a set of error values that can be minimized by adjusting the estimated coordinates. The whole number portions of the resulting differences can be disregarded, as representing the numbers of whole cycles of the $L_1 - L_2$ carrier difference in the various links 17. This step yields position coordinates that are typically accurate to within ten centimeters or less.

In a further procedure, which can be implemented immediately after the $L_1 - L_2$ carrier phase procedure described immediately above, differences are computed between the estimated ranges and the corresponding individual $L_1$ or $L_2$ phase measurements. Again, the fractional portions of the resulting differences form a set of error values that can be minimized by adjusting the estimated coordinates of the remote receiver 11. This procedure yields position coordinates that are accurate to within about one centimeter, which represents just a small fraction of each cycle of the $L_1$ or $L_2$ carriers.

Finally, this same procedure can be followed for a weighted average of the individual $L_1$ and $L_2$ carrier phase measurements. This yields position coordinates that are accurate, typically, to less than one centimeter in any direction.

It will be appreciated that the differential positioning technique described in detail above is effective whether the remote receiver 11 remains stationary or is continuously moving. This is because the final position determination is made in step 49 using merely an estimate of the receiver's position and the adjusted, smoothed range measurements to each satellite 13. Movement of the receiver is thus accommodated just as readily as movement of the satellites.

It should be appreciated from the foregoing description that the present invention provides a significantly improved technique for rapidly and accurately determining the position coordinates of a remote, movable receiver relative to a fixed reference receiver. The technique utilizes successive code measurements and carrier phase measurements of both the $L_1$ and $L_2$ carrier signals broadcast from four or more orbiting GPS satellites. Code measurements based on a weighted average of the individual $L_1$ and $L_2$ code measurements in each satellite/receiver link are adjusted in accordance with the corresponding carrier phase measurement for an $L_1-L_2$ carrier difference signal and are further smoothed over time. This yields a rapid determination of the remote receiver's position coordinates, with progressively increasing accuracy. After merely about two to three minutes of processing, a wide laning procedure can be implemented to yield a position determination that is accurate to within about one centimeter.

Although the present invention has been described in detail with reference to the presently preferred embodiment, those skilled in the art will appreciate that various modifications can be made without departing from the invention. Accordingly, the invention is defined only by the following claims.

I claim:

1. A method for determining the coordinates of a remote receiver relative to a reference receiver having known coordinates, the method using the modulated $L_1$ and $L_2$ carrier signals broadcast from four or more GPS satellites, the method comprising steps of:
   measuring the range to each of the four or more satellites from both the reference receiver and the remote receiver, at each of a succession of time points, the step of measuring including steps of
      detecting the $L_1$ and $L_2$ codes, to produce a code measurement for each satellite/receiver pair, at each time point, the code measurement being based on a predetermined linear combination of the detected $L_1$ and $L_2$ codes, and
      detecting the $L_1$ and $L_2$ carrier phases, to produce a carrier phase measurement for each satellite/receiver pair, at each time point, the carrier phase measurement being based on a predetermined linear combination of the detected $L_1$ and $L_2$ carrier phases,
      wherein the predetermined linear combinations of the detected $L_1$ and $L_2$ codes and carrier phases are selected such that the ionosphere affects the resulting code and carrier phase measurements substantially equally;
   smoothing the successive code measurements for each satellite/receiver pair in accordance with the corresponding carrier phase measurements for the same time point and in accordance with the code measurements and carrier phase measurements for previous time points, to produce a smoothed code measurement for each satellite/receiver pair, at each time point;
   comparing the successive smoothed code measurements for the reference receiver with theoretical range values based on the known coordinates of the reference receiver and known orbits of the four or more satellites, to produce an error value for each smoothed code measurement for the reference receiver;
   determining the errors in the internal clocks of each of the four or more satellites, based on the error values produced in the preceding step of comparing;
   adjusting the successive smoothed code measurements for the remote receiver, to eliminate the effects of the satellite clock errors determined in the preceding step of determining and thereby produce a succession of corrected range measurements for each satellite; and
   determining the particular coordinates of the remote receiver that minimize errors in the successive corrected range measurements.

2. A method as defined in claim 1, wherein the first step of detecting that is part of the step of measuring includes steps of:
   detecting the individual $L_1$ and $L_2$ codes for each satellite/receiver pair; and
   computing a weighted average of the detected individual $L_1$ and $L_2$ codes to produce the code measurement for each satellite/receiver pair, at each time point, each of the code measurements having less noise then the individual $L_1$ and $L_2$ codes on which it is based.

3. A method as defined in claim 1, wherein:
   the second step of detecting that is part of the step of measuring includes steps of differencing the $L_1$ and $L_2$ carrier signals for each satellite/receiver pair, at each time point, and detecting the carrier phase of each resulting $L_1-L_2$ difference signal, this difference being the carrier phase measurement; and
   the step of smoothing includes steps of
      computing an expected value for each code measurement, based on the corresponding smoothed code measurement for the previous time point and on the difference between the corresponding carrier phase measurements for the same time point and the previous time point, and
      computing a weighted average of each code measurement and the corresponding expected code measurement, to produce the smoothed code measurement for each satellite/receiver pair, at each time point.

4. A method as defined in claim 3, wherein the final step of determining includes steps of:
   providing theoretical range values from the remote receiver to the four or more satellites, at each time point, based on an estimate of the remote receiver's position coordinates and the known satellite orbits;
   differencing the theoretical range values, determined in the step of providing, and the corresponding corrected range measurements, produced in the step of adjusting, to produce a set of error values for each time point; and
   adjusting the estimate of the remote receiver's position coordinates at each time point, to minimize the corresponding set of error values.

5. A method as defined in claim 4, wherein:
   the method steps are performed recursively; and
   the estimate of the remote receiver's position coordinates at each time point, used in the step of providing, is based on the adjusted estimate provided in the step of adjusting for the previous time point.

6. A method as defined in claim 3, wherein the final step of determining includes steps of:

differencing the $L_1-L_2$ carrier phase measurements for the remote receiver, produced in the preceding step of measuring, and the corresponding corrected range measurements, produced in the step of adjusting, to produce a set of error values for each time point; and determining the particular position coordinates for the remote receiver that minimize the set of error values at each time point.

7. A method as defined in claim 3, wherein the final step of determining includes steps of:

differencing the $L_1$ carrier phase measurements for the remote receiver, produced in the step of measuring, and the corresponding corrected range measurements, produced in the step of adjusting, to produce a set of error values for each time point; and determining the particular position coordinates for the remote receive that minimize the set of error values at each time point.

8. A method as defined in claim 3, wherein the final step of determining includes steps of:

computing a weighted average of the $L_1$ and $L_2$ carrier phase measurements, produced in the step of measuring for the remote receiver, at each time point;

differencing the weighted averages, computed in the preceding step of computing, and the corresponding corrected range measurements, produced in the step of adjusting, to produce a set of error values for each time point; and determining the particular position coordinates for the remote receiver that minimize the set of error values at each time point.

9. A method as defined in claim 1, wherein the method is performed recursively, in real time.

10. A method as defined in claim 1, wherein:

the step of comparing includes a step of differencing the successive smoothed code measurements for the reference receiver and the theoretical range values, based on the known coordinates of the reference site and known orbits of the four or more satellites, to produce the error value for each satellite, at each time point; and the first step of determining includes a step of defining the satellite clock errors to be equal to the fractional portions of the corresponding error values produced in the preceeding step of differencing.

* * * * *